ENCLOSURE FOR CIRCUIT INTERRUPTERS

Filed March 31, 1960 3 Sheets-Sheet 1

ENCLOSURE FOR CIRCUIT INTERRUPTERS

Filed March 31, 1960 3 Sheets-Sheet 2

INVENTORS
John N. Groves &
Donald G. Portman
BY
ATTORNEY.

ENCLOSURE FOR CIRCUIT INTERRUPTERS

Filed March 31, 1960 3 Sheets-Sheet 3

3,160,721
Patented Dec. 8, 1964

3,160,721

ENCLOSURE FOR CIRCUIT INTERRUPTERS

John N. Groves, Monaca, and Donald G. Portman, Brighton Township, Beaver County, Pa., assignors to Westinghouse Electric Corporation, East Pittsburgh, Pa., a corporation of Pennsylvania Filed Mar. 31, 1960, Ser. No. 18,957
9 Claims. (Cl. 200—50)

This invention relates, generally, to enclosing structures or cabinets, and particularly, to cabinets housing circuit interrupters operable from outside of the cabinets.

An object of the invention is to provide an improved cabinet for enclosing a circuit interrupter operable from outside of the cabinet, which cabinet embodies interlocking means for preventing opening of the circuit when the cabinet interrupter is closed, wherein means are provided for defeating the interlocking means to permit opening of the cabinet when the circuit interrupter is closed.

Another object of the invention is to provide an improved circuit interrupter cabinet which requires two operations performed simultaneously in order to effect opening of the cabinet when the enclosed circuit interrupter is in the closed position.

A further object of the invention is to require that at least one of the aforesaid operations be performed by means of a tool.

A more general object of the invention is to provide an improved circuit interrupter cabinet which requires that a workman be familiar with the operation of the cabinet before he can open the cover when the enclosed circuit interrupter is in the closed position.

In accordance with one embodiment of the invention, a cabinet for enclosing a circuit interrupter is provided with a door which is latched in a closed position by a spring-biased cover-latch. The cover-latch is operated to cam the door into a sealed position by operation of a manually operated handle which is disposed on the outside of the cover. A releasing member, which is manually operated by the use of a screwdriver or other tool, is provided to move the cover-latch, against the bias of a spring, into an unlatched position to effect opening of the door. The cover-latch operating handle and releasing member are connected by means of a lost-motion connection so that it is necessary to use a screwdriver or other tool in order to operate the releasing member to effect an opening operation. An interlocking latch is provided to prevent opening of the cover-latch when the enclosed circuit interrupter is in the closed position.

According to this invention, the pivot of the interlocking latch extends out through the cabinet, and a knob is provided at its outer end to permit manual rotation of the interlocking latch to its unlatching position to thereby permit opening of the cover-latch and consequent opening of the cabinet cover. The interlocking latch is spring biased to its latching position so that the operator must hold it in unlatching position against the bias of a spring during an opening operation. Since the releasing member and interlocking latch are both spring-biased to latching positions, they must be operated to unlatching positions simultaneously in order to effect a cabinet cover opening operation when the enclosed circuit interrupter is in the closed position. It can be understood that only authorized personnel who are familiar with the operation of the cabinet will be readily able to open the cabinet cover when the enclosed interrupter is in the closed position.

For a better understanding of the nature and objects of the invention, reference may be had to the following detailed description, taken in conjunction with the accompanying drawings, in which.

The general structure of the circuit-interrupter enclosure or cabinet of this invention is described and claimed in the patent to James O. Rexroad entitled "Enclosed Circuit Interrupter" Patent No. 3,054,866, issued September 18, 1962.

Figure 1:
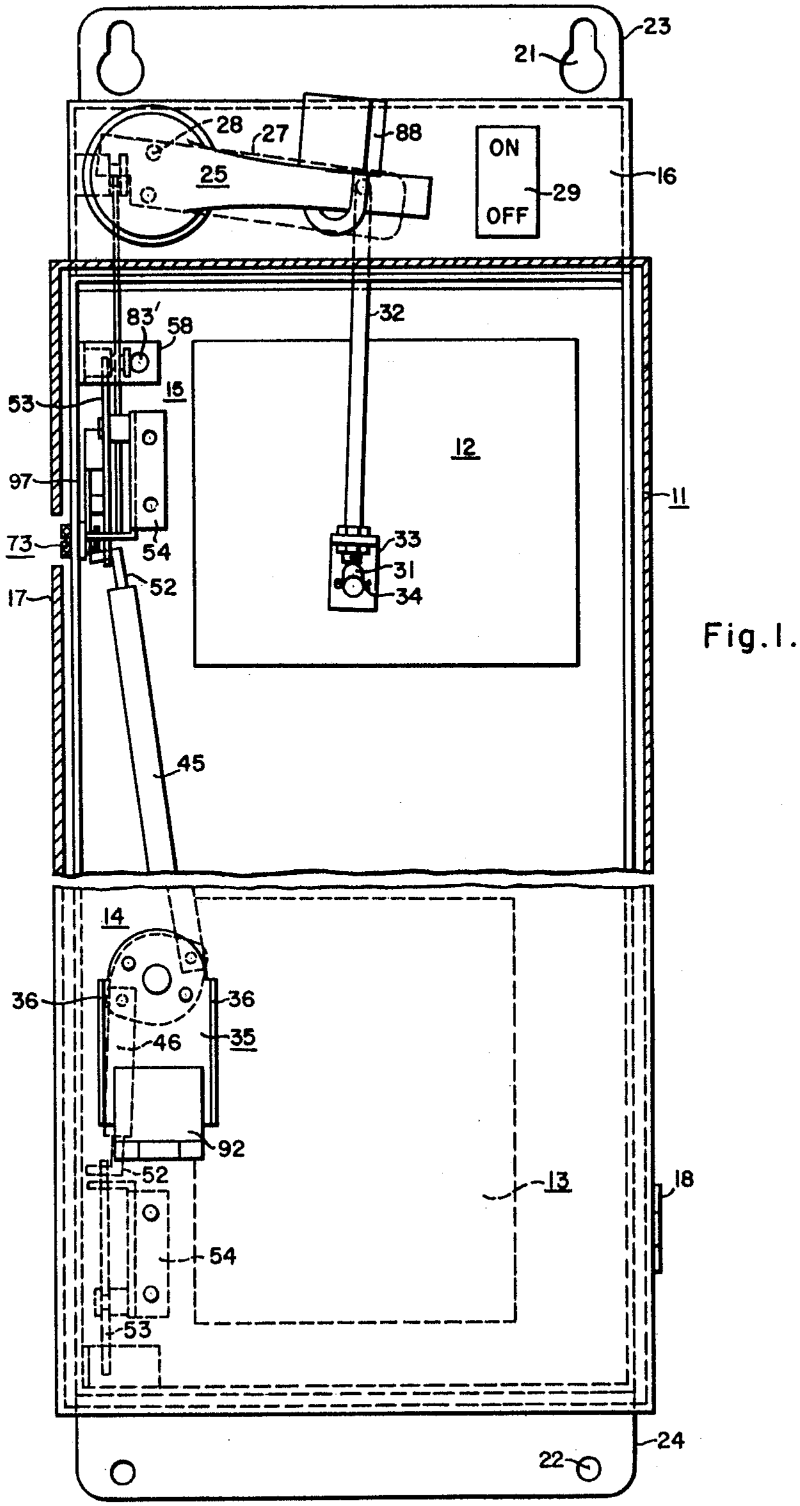
FIGURE 1 is a view, partly in front elevation and partly in section of a cabinet and mechanism for operating a circuit interrupter mounted inside the cabinet.
Figure 2:
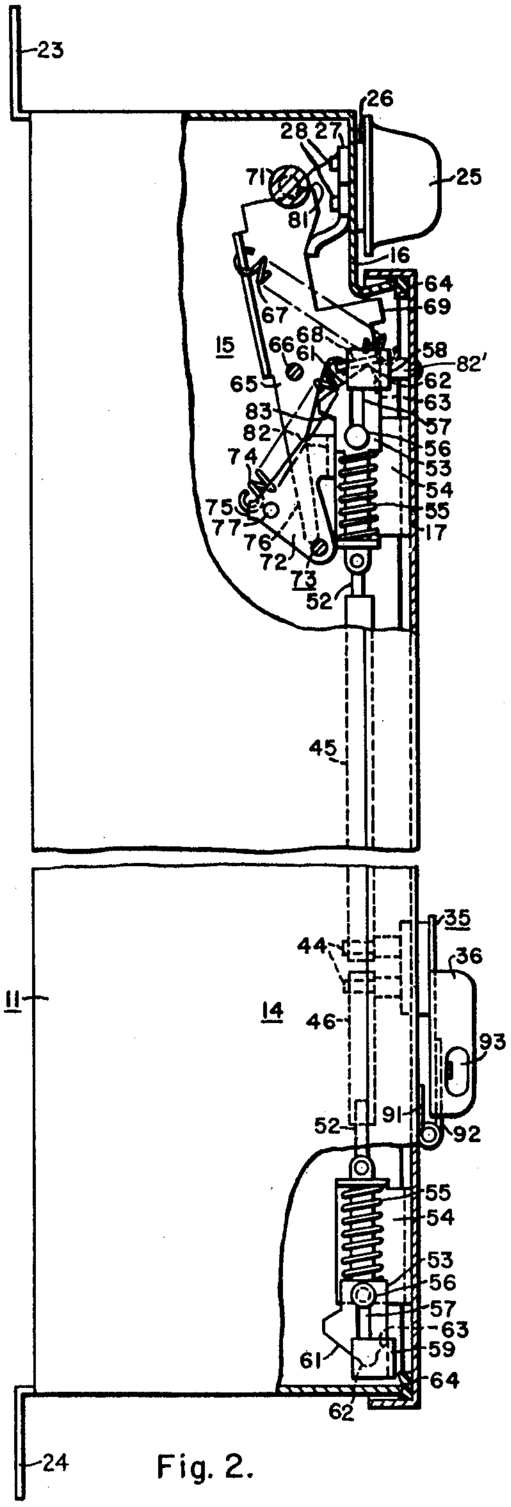
FIG. 2 is a view, partly in side elevation and partly in section, of the structure shown in FIG. 1.

Referring to the drawings, and particularly to FIGS. 1 and 2, the structure shown therein comprises a sheet metal enclosure or cabinet 11 of dust-tight or liquid-tight construction inside of which a circuit interrupter 12, a motor starter 13, a cover latching mechanism 14 and an interlocking mechanism 15 are mounted. As shown, the front wall of the cabinet 11 comprises a fixed portion 16 and an openable cover 17. The fixed portion 16 of the front wall may be formed as an integral part of the cabinet 11. The cover or door 17 may be hinged to the cabinet by means of a plurality of hinges 18, only one of which is shown. The cabinet 11 may be mounted on a vertical panel or other supporting member by means of openings 21 and 22 provided in extensions 23 and 24, respectively, of the back wall of the cabinet. The use of the extensions makes it unnecessary to have holes inside of the cabinet through which dust or liquid might enter.

An external operating handle 25 is rotatably mounted on the fixed portions 16 of the front wall of the cabinet. The handle 25 may be similar to the one described in Patent No. 2,806,099, issued September 10, 1957 to J. O. Rexroad. The handle has a short shaft or projection which extends through an opening in the bottom of a cup-shaped member 26 (FIG. 2) which is attached to the portion 16 of the cabinet. An operating lever 27 is attached to the inner end of the projection on the handle by means of screws 28. An indicating plate 29 containing the words "on" and "off" (FIG. 1) is attached to the fixed portion 16 to indicate whether the circuit interrupter 12 is closed or open.

The circuit interrupter 12 may be a manually operable switch of the type described in Patent No. 2,849,572, issued August 26, 1958 to A. R. Cellerini et al. As described in the aforesaid patent, the contact members of the switch are opened and closed by a toggle mechanism which is actuated by an oscillating operating member 31. If desired, the circuit interrupter 12 may be of the type operated to its open and closed positions by rotation of an operating member that rotates in a plane parallel to the planes of the base and cover of the interrupter.

As shown in FIG. 1, the external operating handle 25 is continuously connected to the operating member 31 of the circuit interrupter 12 at all times regardless of the position of the cover 17 of the cabinet. As shown, one end of a connecting link or rod 32 is attached to the operating lever 27. The other end of the rod 32 is attached to an angle-shaped operator or clip 33. One end of the operating member 31 of the interrupter 12 extends through one leg of the operator 33 and is attached thereto by means of a pin 34. Thus, the operating handle 25 is continuously connected to the operating member 31 of the interrupter 12, so that it is impossible to move the interrupter operating member if the external handle 25 is locked, even though the door 17 may be open.

Figure 3:
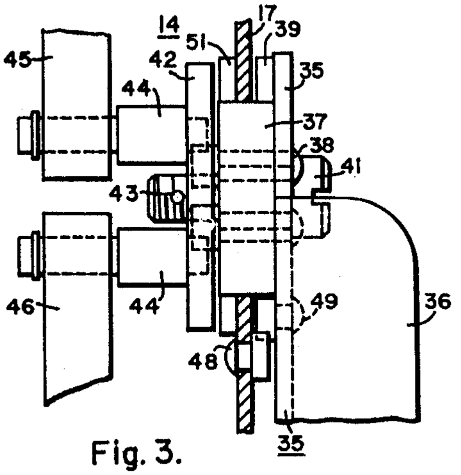
FIGS. 3 and 4 are enlarged detail views, in side and front elevation, respectively, of part of the cover latching mechanism.

The latching mechanism 14 is provided to force the door or cover 17 to the fully-closed and sealed position, and the interlocking mechanism 15 cooperates with the latching mechanism to insure that the interrupter can normally be closed only when the cover is in the fully-closed position. The cover 17 is shown in the fully-closed and sealed position in FIG. 2. As shown most clearly in FIGS. 3 and 4, the latching mechanism 14 comprises a cover-closing handle, indicated generally at 35, having upturned sides 36. The cover-closing or cover-sealing handle 35 is attached to a bushing 37 (FIG. 3) by means of rivets 38. The bushing 37 is rotatably mounted in the cover 17. A spacer 39 is disposed around the bushing 37 between the cover-closing handle 35 and the cover 17. A special screw or releasing member 41 extends through openings in the cover-closing handle 35 and the bushing 37, and is threaded into an actuating plate 42 disposed inside the cover 17. A pin 43 is inserted through the inner end of the screw 41 to prevent it from being removed from the plate 42. Two spaced pins 44 are riveted to the actuating plate 42. One end of a connector 45 is attached to the upper pin 44. One end of another connector 46 is attached to the lower pin 44.

Figure 4:
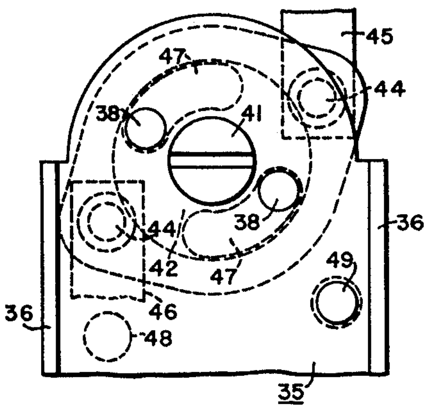

As shown most clearly in FIG. 4, the head or inner end of each one of the rivets 38 is disposed in a curved slot 47 in the plate 42. In this manner, a lost motion connection is provided between the cover-closing handle 35 and the actuating plate 42. Thus, the handle 35 will drive the actuating plate 42 to the closed-cover position and the actuating plate will drive the handle to the open-cover position, but the handle can be in the open-cover position while the actuating plate is in the closed-cover position. Stop pins or rivets 48 and 49, located in the cover 17 and the handle 35 respectively, prevent the handle from going past the open-cover position. Therefore, it is necessary to open the cover by rotating the special screw or releasing member 41 which threads into the actuating plate 42. This movement will rotate the handle 35 and plate 42 to the open-cover position. The screw 41 may be driven by means of a screwdriver or other suitable tool. Thus, a tool separate from the cover closing handle 35 is required to open the cover. The spacer 39 and a spacing washer 51 permit the plate 42 to be rotated easily by means of the screw 41.

As shown in FIGS. 1 and 2, the upper end of the connector 45 is attached to a rod 52 which, in turn, is attached to a cover latch 53 slidably disposed in a bracket 54 attached to the cover 17. Likewise, the lower end of the connector 46 is attached to another rod 52 which is attached to another cover latch 53 slidably disposed in another bracket 54. Thus, the cover latches are moved in opposite directions when the actuating plate 42 is rotated in the manner hereinbefore described. A compression spring 55 is disposed on each cover latch 53 between a shoulder on the latch and a portion of the bracket 54 to bias the cover latches 53 toward the closed-cover position. Movement of each cover latch 53 is limited by a pin 56 disposed in a slot 57.

As shown in FIG. 2, a bracket 58 is attached to one side wall of the cabinet 11 to be engaged by the upper cover latch 53. Likewise, a similar bracket 59 is attached to the cabinet to be engaged by the lower latch 53. Each cover latch 53 has a sloping surface 61 which engages one leg of one of the brackets 58 or 59 as the cover is being closed, thereby compressing the springs 55. When a nose 62 on each latch passes underneath the leg of its bracket a sloping or cam surface 63 engages the leg of the bracket. The cover 17 may then be forced or cammed to the fully-closed and sealed position shown in FIG. 2 by rotating the cover-closing handle 35 to force the cover latches 53 underneath the legs of the brackets, thereby compressing a gasket 64 and sealing the cabinet against the entrance of extraneous matter such as dust, liquid or gases. It will be noted that the compression springs 55 aid in forcing the cover latches 53 underneath the brackets 58 and 59. As was previously explained, because of the lost motion connection between the cover-closing handle 35 and the actuating plate 42, the latches 53 cannot be released by means of the handle 35, but they must be released by means of the screw 41 to let up the pressure on the gasket seal or to open the cover. This prevents some bystander from loosening the seal, by merely turning the cover closing handle 35.

As was previously explained, the interlocking mechanism 15 cooperates with the latching and sealing mechanism 14 to normally prevent closing of the circuit interrupter unless the cover 17 is in the fully-closed position and sealed against the gasket 64. As shown in FIG. 2, the interlocking mechanism 15 comprises an interlocking member 65 which is pivotally mounted on the side of the cabinet 11 by means of a pin 66. The interlocking member 65 is biased in a clockwise or latching direction by a spring 67 and is actuated in the other direction by the nose 62 of one of the cover latches 53 engaging a projection 68 on the member 65. The member 65 may also be actuated against the tension of the spring 67 by manually pressing on a projection 69 on the lever 65. A guide member 71 is attached to the side of the housing. The member 71 also functions as a stop member to limit the movement of the member 65 in the counterclockwise or unlatching direction.

As also shown in FIG. 2, an interlocking latch 72 is pivotally mounted on a pivot indicated generally at 73. The interlocking latch 72 is biased in a clockwise or latching direction by a spring 74 which is stretched between the projection 68 on the member 65 and a projection 75 on the latch 72. An arm 76 on the member 65 is disposed to engage a pin 77 on the interlocking latch 72 for a purpose which will be explained more fully hereinafter.

Figure 5:
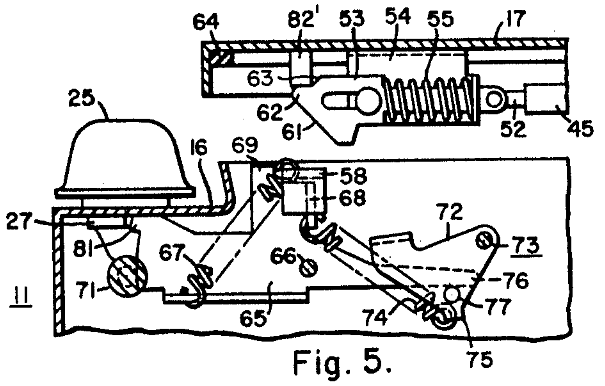
FIGS. 5, 6, 7 and 8 are detail views of the interlocking mechanism.

The operation of the interlocking mechanism may be more clearly understood by referring to FIGS. 2, 5, 6, 7 and 8. In FIG. 5, the cover 17 is shown open and the circuit interrupter is "off." The operating lever 27 permits the interlocking member 65 to rotate clockwise until it strikes the fixed portion 16 of the cabinet 11. A projection 81 on the interlocking member 65 will engage the lever 27 to prevent rotation of the handle 25 in a counterclockwise direction, as viewed in FIG. 1, thus preventing closing of the circuit interrupter 12.

As the cover 17 is closed, the latch 53 will strike the angle bracket 58 and be cammed to the right because of the sloping surface 61. A guide pin 82′ on the cover will enter a hole 83′ (FIG. 1) in the angle bracket 58, thereby ensuring proper positioning of the cover latch 53 with respect to the interlocking member 65, the interlocking latch 72 and the bracket 58.

Figure 6:
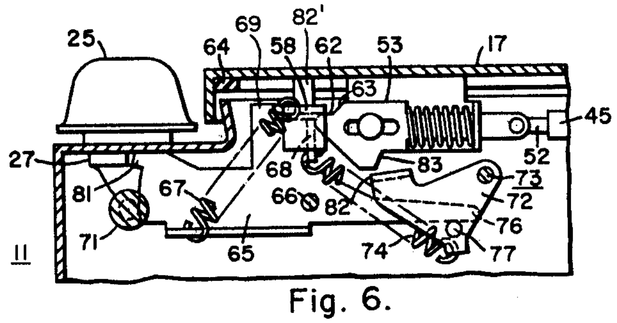

In FIG. 6, the interrupter is "off" and the cover is closed far enough for the nose 62 of the latch 53 to engage underneath the bracket 58. The interlocking latch 72 is pivoted free of the cover latch 53 by the arm 76 of the interlocking member 65 engaging the pin 77 in the latch 72. The circuit interrupter is prevented from being closed, by movement of the handle 25, because the projection 81 on the member 65 will engage the operating lever 27 attached to the handle 25 to prevent the handle from being rotated to close the interrupter. This prevents the interrupter from being closed by the handle 25 and insures that the cover 17 must be fully closed with pressure against the gasket 64 before the electrical equipment controlled by the interrupter 12 (FIG. 1) can be energized and put into use. The cover latch 53 will not close completely to free the lever 27 from engagement by the projection 81 unless the cover latch 53 is forced to the fully closed or cover-sealed position by means of the closing or sealing handle 35 (FIG. 1) in the manner previously described. The cover gasket 64 will then be compressed, and the handle 25 may be operated to close the interrupter.

Figure 7:
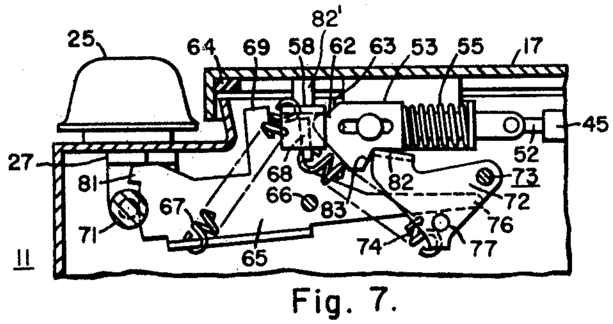
Figure 8:
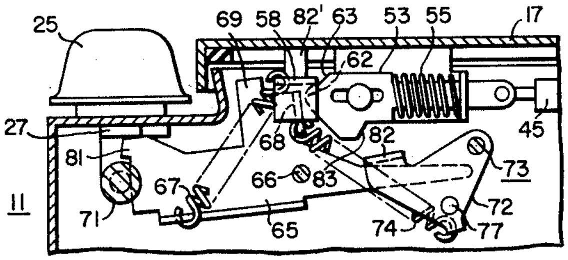

Under special circumstances, a skilled electrician who understands the operation of the device, may find it desirable to close the interrupter 12 while the cover is open in order to make tests on the equipment. This may be done by moving the interlocking member 65 downwardly by pressing on the projection 69 to clear the projection 81 away from the operating lever 27 to thereby permit closing of the circuit interrupter 12 (FIG. 1) by operation of the handle 25. After the interrupter has been closed and the tests or other work completed, the cover 17 may be partly closed as shown in FIG. 7. The projection 68 on the member 65 is moved counterclockwise about the pivot 66 sufficiently to permit the spring 55 to move the cover latch 53 underneath the bracket 58, thereby holding the cover 17 partly closed. The cover latch 53 is moved to the left by the spring 55 far enough to permit a projection 82 on the interlocking latch 72 to engage a shoulder 83 on the cover latch 53. Therefore, the cover 17 cannot be opened without first opening the circuit interrupter, thereby disengaging the lever 27 from the projection 81 and permitting the spring 67 to return the interlocking member 65 to the position shown in FIG. 6. In this position, the arm 76 on the member 65 engages the pin 77 on the interlocking latch 72 rotating the latch 72 counterclockwise to disengage the projection 82 from the shoulder 83 of the cover latch 53. The cover 17 can then be opened by means of the screw 41 (FIG. 4) in the manner previously described. The position shown in FIG. 7 will also be obtained when the cover has been fully closed and an attempt has been made to open the cover with the interrupter closed.

It should be noted that the interlock cannot be defeated by pressing on the projection 69 of the interlocking member 65 without first gaining access to the inside of the switch by opening the cover 17. This requires that the screw or releasing member 41 be rotated by a tool other than the handle 35 and the method of opening the cover is not obvious to the ordinary workman. After the cover is open, the method of defeating the interlock is not obvious since the end of the lever 27 and the projection 81 on the member 65 are obscured from view. Therefore, only someone who has been instructed knows that the interlock can be defeated by pressing on the projection 69 of the member 65. Thus, the ordinary workman is protected against injury caused by coming in contact with energized parts of a switch.

The handle 25 may be locked in the "off" position by means of a padlock 88 (FIG. 1) retaining a locking lever (not shown) in locking position to prevent rotation of the handle 25 in a manner well known in the art and specifically described in the aforementioned application of James O. Rexroad, Serial No. 797,131.

As shown in FIG. 1, one strap 91 of a hinge is secured to the cover 17. When the cover is closed the other strap 92 (FIGS. 1 and 2) may be swung into position between the sides 36 of the cover closing handle 35. A knockout 93 is provided in one of the sides 36. If it is desired to lock the cover in the closed position, the knockout 93 may be removed and a hasp of a padlock inserted in the knockout opening. As previously explained, the handle 35 is rotated by means of the screw 41 to release the cover latching mechanism and permit opening of the cover. Therefore, opening of the cover can be prevented by locking the hinge strap 92 between the sides 36 to prevent rotation of the handle 35.

When a circuit interrupter enclosure or cabinet is used in normal service, it is often desirable to enable a workman to open the cabinet in order to inspect the interior thereof, without interrupting the service. Means, therefore, are provided for moving the interlocking latch 72 out of latching position, when the circuit interrupter 12 (FIG. 1) is closed, to enable movement of the cover latch 53 out of latching position in order to effect opening of the cover 17.

Figure 9:
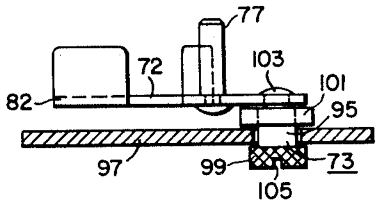
FIG. 9 is a detail view illustrating the interlock defeating means of the invention.

As shown in FIGS. 1 and 9, the pivot 73 of the interlocking latch 72 includes a bushing 95 that extends through an opening in a side wall 97 of the cabinet 11. A cylindrical flange on interlock releasing handle 99 at the outer end of the bushing 95 and a washer 101 at the inner end thereof, hold the parts in place. A rivet 103 connects the interlocking latch 72 and pivot 73 for unitary movement. The handle 99 is knurled so that it will be easily operated by hand, and a slot 105 is provided at the end thereof so that it can be operated by means of a screwdriver or other tool.

The operation of the interlocking-latch defeating means is as follows: As shown in FIG. 7, when the circuit interrupter 12 (FIG. 1) is closed, the operating lever 27 restrains the projection 81 and, therefore the interlocking member 65 from moving clockwise about its pivot 66 under the bias of the spring 67. In this position, the arm 76, of the interlocking member 65, permits clockwise rotation of the interlocking latch 72 about its pivot 73, under the bias of the spring 74, to the latching position shown in FIG. 7 wherein the projection 82, of the interlocking latch 72, engages the shoulder 83 of the cover latch 53 thereby preventing unlatching movement of the cover latch 53. In order to gain access to the interior of the cabinet 11, an operator can rotate the interlock defeating handle 99 (FIG. 9) to thereby rotate the pivot 73 and interlocking latch 72 against the bias of the spring 74 (FIG. 8) to the unlatched position shown in FIG. 8. The operator must hold the interlocking latch in the position shown in FIG. 8 and, in the same manner previously described, he must rotate the screw 41 (FIG. 4) by means of a screwdriver or other tool, to move the cover-latches 53 (FIG. 2) in unlatching direction in order to effect opening of the cover 17. Since the interlocking latch 72 and cover latch 53 are biased towards their latching positions by the springs 74 and 55 respectively, these members must be operated simultaneously in order to effect an opening operation of the cabinet 11. It can be understood that, because of the complexity of operation of applicant's device, only an authorized person will ordinarily be able to open the cabinet 11 when the circuit interrupter 12 (FIG. 1) is closed.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In combination, a circuit interrupter having an operating member operable to open and close the interrupter, a cabinet in which the interrupter is mounted, said cabinet having a fixed front portion, an external operating handle extending from said fixed front portion and operable to actuate said operating member, an openable cover positioned at the front of said cabinet, said operating handle being continuously connected to said operating member regardless of the position of said cover, a cover latch latching said cover in a closed position, a first biasing means biasing said cover latch into latching position, tool-operated means mounted on said cover and operable to move said cover latch against the bias of said first biasing means out of latching position to permit opening of said cover, an interlocking latch latching said cover latch in latching position when said cover and circuit interrupter are both closed, a second biasing means biasing said interlockng latch into latching position, an interlocking member operating automatically to move said interlocking latch against the bias of said second biasing means out of latching position when said cover is closed and said interrupter is opened, and manually operable means mounted on said cabinet and operable to move said interlocking latch against the bias of said second biasing means out of latching position when said cover and circuit interrupter are both closed.

2. In combination, a circuit interrupter having an operating member operable to open and close the interrupter, a cabinet in which the interrupter is mounted, said cabinet having a fixed front portion, an external operating handle extending from said fixed front portion, an openable cover positioned at the front of said cabinet, means operatively connecting said external operating handle to said operating member in such a manner that said operative connection is maintained regardless of the position of said cover, a cover latch latching said cover in a closed position, a first spring means biasing said cover latch into latching position, releasing means mounted on said cover and operable to move said cover latch out of latching position to permit opening of said cover, an interlocking latch latching said cover latch in latching position when said cover and circuit interrupter are both closed, a second spring means biasing said interlocking latch into latching position, means operating automatically to move said interlocking latch against the bias of said second spring means out of latching position when said cover is in the closed position and said interrupter is opened, and manually operable means mounted on said cabinet for moving said interlocking latch against the bias of said second spring means out of latching position when said cover and circuit interrupter are both closed thereby permitting opening of said cover by operation of said releasing means when said circuit interrupter is closed.

3. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover for the cabinet, means connecting said external operating handle with said circuit interrupter operating member regardless of the position of said cover, a cover latching mechanism disposed inside of the cabinet at least when said cover is closed, a releasing member supported externally on said cover and being connected to said latching mechanism by means of a lost-motion connection, a first biasing means biasing said releasing member away from the releasing position, said releasing member requiring the use of a tool to effect release of said latching mechanism to permit opening of said cover, said latching mechanism being releasable only by operation of said tool-operated releasing member, an interlocking latch preventing release of said latching mechanism by operation of said releasing member when said cover and circuit interrupter are both closed, manually operable interlock-defeating means operable to move said interlocking latch to an inoperative position, and a second biasing means biasing said interlocking latch and interlock-defeating means to a position latching said latching mechanism closed whereby an opening operation of said cover when said interrupter is closed requires an operation of said releasing member against the bias of said first biasing means and a separate operation of said interlock-defeating means against the bias of said second biasing means which operations must be effected simultaneously.

4. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover supported at the front of the cabinet, a cover latching mechanism disposed inside of the cabinet at least when said cover is closed, manually operable means rotatably mounted on the outside of the cover for actuating the latching mechanism to force the cover to its fully closed position, a releasing member for releasing the latching mechanism, said releasing member being operable only by the use of a tool other than said manually operable means, an interlocking latch in latching position when said interrupter is closed to prevent release of said latching mechanism, manually operable interlock-defeating means operable to move said interlocking latch to an inoperative position, means biasing said interlocking latch into latching position when said interrupter is closed whereby an opening operation of said cabinet when said interrupter is closed requires an operation of said releasing member and a separate operation of said interlock-defeating means which operations must be effected simultaneously.

5. In combination, a circuit interrupter having an operating member operable to open and close the interrupter, a cabinet in which said interrupter is mounted, said cabinet having a fixed front portion, an operating handle mounted externally on said fixed front portion and operable to actuate said operating member, an openable cover positioned at the front of said cabinet, means operatively connecting said external operating handle to said operating member in such a manner that said operative connection is maintained regardless of the position of said cover, a cover latching mechanism, means rotatably mounted on the outside of said cover for actuating said cover latching mechanism to force said cover to its fully closed position, a releasing member supported externally on said cover and being connected to said latching mechanism by means of a lost-motion connection, said releasing member requiring the use of a tool to effect release of said latching mechainsm to permit opening of said cover, an interlocking latch in latching position when said interrupter and cover are both closed to prevent release of said cover latching mechanism, interlock-defeating means operable to move said interlocking latch to an unlatched position, means biasing said interlocking latch into latching position when said interrupter is closed whereby an opening operation of said cover when said interrupter is closed requires an operation of said releasing member and a separate operation of said interlock-defeating means which operations must be effected simultaneously.

6. In combination, a circuit interrupter having a movable operating member for opening and closing said interrupter, a cabinet in which said interrupter is mounted, said cabinet having a fixed front portion, an external operating handle extending from said fixed front portion for actuating said operating member, an openable cover for said cabinet, means continuously connecting said external operating handle to said operating member regardless of the position of said cover, a cam-type cover latching mechanism disposed inside said cabinet at least when said cover is closed, a cover closing handle movably mounted on the outside of said cabinet for actuating said cam-type cover latching mechanism to force said cover to its fully closed position regardless of the position of said external operating handle, tool-operated cover releasing means externally operable to release said cam-type cover latching mechanism to permit opening of said cover, a spring-biased interlocking member actuated by said cam-type cover latching mechanism to permit said circuit interrupter to be closed when said cover is fully closed by means of said cover closing handle, said interlocking member being manually releasable to permit said circuit interrupter to be closed when said cover is opened, said interlocking member operating automatically to prevent release of said cam-type cover latching mechanism to thereby prevent opening of said cover when said cover is closed and said circuit interrupter is closed, and means operable from outside of said housing for defeating said interlocking member to permit release of said cam-type cover latching mechanism by operation of said externally operable tool-operated cover releasing means to thereby permit opening of said cover when said circuit interrupter is closed.

7. In combination, a circuit interrupter having a movable operating member for opening and closing said interrupter, a cabinet in which said interrupter is mounted, said cabinet having a fixed front portion, an external operating handle extending from said fixed front portion for actuating said operating member, an openable cover for said cabinet, a cam-type cover latching mechanism, manually operable means separate from said operating handle and movably mounted on the outside of said cover for actuating the cam-type cover latching mechanism to cam said cover to its fully-closed position, additional manually operable means accessible from outside of said cabinet for releasing said cam-type cover latching mechanism to permit opening of said cover, said cam-type cover latching mechanism being releasable only by the operation of said additional manually operable means, interlocking means cooperating with said cam-type cover latching mechanism to prevent closing of said circuit interrupter unless said cover is fully closed, said interlocking means operating automatically to prevent release of said cam-type cover latching mechanism to thereby prevent opening of said cover when said circuit interrupter is closed, and means operable from outside of said cabinet to defeat said interlocking means to permit release of said cam-type cover latching mechanism to thereby permit opening of said cover when said circuit interrupter is closed.

8. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover positioned at the front of said cabinet, a cam-type cover latching mechanism, manually operable means separate from said operating handle and movably mounted on the outside of said cover for actuating said cam-type cover latching mechanism to force said cover to a fully-closed position with a camming action, additional manually operable means accessible from outside of said cabinet for releasing said cam-type cover latching mechanism to permit opening of said cover, said cam-type cover latching mechanism being releasable only by the operation of said additional manually operable means, said additional manually operable means being operable only by means of a tool, interlocking means cooperating with said cam-type cover latching mechanism to normally prevent closing of said circuit interrupter unless said cover is fully-closed, said interlocking means operating automatically to prevent release of said cam-type cover latching mechanism to thereby prevent opening of said cover when said circuit interrupter is closed, and means operable from outside of said cabinet to defeat said interlocking means to permit release of said cam-type cover latching mechanism to thereby permit opening of said cover when said circuit interrupter is closed.

9. In combination, a circuit interrupter having a movable operating member for opening and closing the interrupter, a cabinet in which the interrupter is mounted, said cabinent having a fixed front portion, an external operating handle extending from said fixed front portion for actuating said operating member, an openable cover positioned at the front of said cabinet, a cover camming and latching mechanism, manually operable means separate from said operating handle and movably mounted on the outside of said cover for actuating said cover camming and latching mechanism to cam said cover to a fully-closed position, additional manually operable means accessible from outside of said cabinet for releasing said cover camming and latching mechanism to permit opening of said cover, said cover camming and latching mechanism being releasable only by operation of said additional manually operable means, said additional manually operable means being operable only by means of a tool, interlocking means cooperating with said cover camming and latching mechanism to normally prevent a closing operation of said circuit interrupter unless said cover is cammed fully-closed, means for defeating said interlocking means when said cover is open to permit a closing operation of said circuit interrupter, said interlocking means operating automatically to prevent opening of said cover when said circuit interrupter is closed, and means operable from outside of said cabinet to defeat said interlocking means to permit opening of said cover when said circuit interrupter is closed.

References Cited by the Examiner

UNITED STATES PATENTS

| | | |
|---|---|---|
| 1,192,397 | Downes et al. | July 25, 1916 |
| 1,568,042 | Broadwell | Jan. 5, 1926 |
| 1,863,224 | Kauffman et al. | June 14, 1932 |
| 2,191,523 | Ellis | Feb. 27, 1940 |
| 2,319,084 | Olofson | May 11, 1943 |
| 2,404,183 | Landmeier | July 16, 1946 |
| 2,759,054 | Goudy et al. | Aug. 14, 1956 |
| 2,907,840 | Cole | Oct. 6, 1959 |
| 2,946,865 | Thomas | July 26, 1960 |
| 3,054,866 | Rexroad | Sept. 18, 1962 |